United States Patent
Gaines

(10) Patent No.: US 11,458,425 B2
(45) Date of Patent: Oct. 4, 2022

(54) OIL FILTER CANISTER DRAIN TOOL

(71) Applicant: SNAP-ON INCORPORATED, Kenosha, WI (US)

(72) Inventor: Preston T. Gaines, Racine, WI (US)

(73) Assignee: SNAP-ON INCORPORATED, Kenosha, WI (US)

(*) Notice: Subject to any disclaimer, the term of this patent is extended or adjusted under 35 U.S.C. 154(b) by 9 days.

(21) Appl. No.: 16/557,098

(22) Filed: Aug. 30, 2019

(65) Prior Publication Data
US 2021/0060462 A1 Mar. 4, 2021

(51) Int. Cl.
| | | |
|---|---|---|
| *B01D 35/16* | (2006.01) | |
| *F01M 11/04* | (2006.01) | |
| *B25B 27/00* | (2006.01) | |
| *F16K 21/14* | (2006.01) | |
| *B01D 35/30* | (2006.01) | |
| *B01D 35/00* | (2006.01) | |

(52) U.S. Cl.
CPC .......... *B01D 35/16* (2013.01); *B25B 27/0042* (2013.01); *F01M 11/0408* (2013.01); *F16K 21/14* (2013.01); *B01D 35/005* (2013.01); *B01D 35/30* (2013.01)

(58) Field of Classification Search
CPC ...... B01D 35/16; B01D 35/005; B01D 35/30; F16K 21/14; B25B 27/0042; F01M 11/0408
See application file for complete search history.

(56) References Cited

U.S. PATENT DOCUMENTS

| | | | |
|---|---|---|---|
| 2,379,995 A * | 7/1945 | Shaw | F16K 21/14 |
| | | | 251/337 |
| 2,506,722 A | 5/1950 | Keuhn et al. | |
| 4,025,048 A | 5/1977 | Tibbitts | |
| 4,745,894 A | 5/1988 | Laipply et al. | |
| 4,893,651 A * | 1/1990 | Herman | B01D 36/006 |
| | | | 137/588 |
| 5,433,410 A | 7/1995 | Foltz | |
| 5,478,049 A | 12/1995 | Lescoe | |
| 5,606,989 A * | 3/1997 | Roll | B01D 36/006 |
| | | | 137/203 |
| 5,609,195 A | 3/1997 | Stricklin et al. | |
| 5,778,928 A | 7/1998 | Boland et al. | |
| 6,485,637 B2 | 11/2002 | Jainek et al. | |

(Continued)

FOREIGN PATENT DOCUMENTS

| | | |
|---|---|---|
| CN | 107789875 A | 3/2018 |
| DE | 19960203 | 6/2001 |

(Continued)

OTHER PUBLICATIONS

UK Combined Search and Examination Report for Application No. GB2012422.8, dated Jan. 15, 2021, 7 pages.

(Continued)

*Primary Examiner* — Liam Royce
(74) *Attorney, Agent, or Firm* — Seyfarth Shaw LLP

(57) ABSTRACT

A drain tool assembly adapted to couple to a housing without causing fluid to flow from the housing until moved to a draining position. The drain tool assembly avoids fluid spillage by sealing a body to the housing and then engaging a plunger of the housing by moving and locking a sleeve to initiate a flow of fluid from the housing.

13 Claims, 3 Drawing Sheets

(56) References Cited

U.S. PATENT DOCUMENTS

| | | |
|---|---|---|
| 7,150,828 B2 | 12/2006 | Sakata et al. |
| 7,297,282 B2 | 11/2007 | Suzumori et al. |
| 10,094,514 B1 | 10/2018 | Sammataro et al. |
| 2005/0258392 A1 | 11/2005 | Pliml, Jr. |
| 2013/0206244 A1 | 8/2013 | Laurel |
| 2021/0060462 A1 | 3/2021 | Gaines |

FOREIGN PATENT DOCUMENTS

| | | |
|---|---|---|
| EP | 0163584 A1 | 12/1985 |
| EP | 0921281 A1 | 6/1999 |
| FR | 2578908 | 9/1986 |
| TW | I663326 | 6/2019 |
| WO | 2017064298 A1 | 4/2017 |

OTHER PUBLICATIONS

Australian Examination Report No. 1 for corresponding AU Application No. 2020210252, dated Apr. 9, 2021, 4 pages.
United Kingdom Examination Report for corresponding UK Application No. GB2012422.8, dated Sep. 16, 2021, 5 pages.
Taiwan Office Action for corresponding TW Application No. 109129050, dated Sep. 11, 2021, 10 pages.
Canadian Office Action for corresponding CA Application No. 3,091,229, dated Oct. 27, 2021, 5 pages.
Chinese Office Action for corresponding Application No. 202010859733.6 dated Dec. 3, 2021, 7 pages.

* cited by examiner

OIL FILTER CANISTER DRAIN TOOL

TECHNICAL FIELD OF THE INVENTION

The present invention relates generally to automotive tools. More particularly, the present invention relates to tools capable of draining oil filter canisters.

BACKGROUND OF THE INVENTION

Tools are often used to drain fluids, for example oil from a housing of an oil filter canister. Without using a tool to drain oil from the housing, technicians must remove the housing from the engine with oil still remaining therein, which causes oil to spill around the circumference of the housing, thereby allowing oil to spill on the technician, the floor and other engine components. This can cause dangerous conditions, because, for example, these other engine components can either be hot, or become hot during operation, causing fire and smoke hazards, the floor can become very slippery and there are heavy metals and other contaminants dangers to humans.

In an attempt to limit the spillage of oil, conventional housings of oil filter canisters 200 (illustrated in FIGS. 3 and 4) include a spring loaded plunger located at the end of a fitting 202 disposed on the housing 200. The plunger is adapted to be depressed by a tool that is coupled to the fitting 202 to allow oil to flow from the housing 200. When the tool is removed from the fitting 202, oil is disallowed from flowing as the plunger is returned to its original position by the spring. Accordingly, the tool has a threaded end adapted to couple with the fitting 202 and depresses the spring loaded plunger in the housing 200 to allow oil to flow out of the fitting 202, thus draining the remaining oil contained within the housing 200. The other end of the tool is typically coupled to a hose for transporting the drained oil to a storage receptacle. However, this tool engages the plunger of the housing 200 as the tool is threaded into the fitting 202, thereby allowing oil to flow before a seal between the tool and housing 200 is created, thus allowing oil to contaminate and leak.

SUMMARY OF THE INVENTION

The present invention broadly relates to an oil canister drain tool assembly with a body that couples to a housing of the oil filter canister, thereby creating a seal. A sleeve of the drain tool assembly is movable to a draining position and locked to engage a plunger of the housing to initiate flow of fluid from the housing, thus allowing a seal to be created between the housing and the tool assembly before flow of fluid. Spillage of the fluid is accordingly substantially reduced or eliminated due to the seal being created before fluid begins to flow from the housing. When draining of the fluid is complete, the sleeve is unlocked and returned to an undraining position to cease the flow of fluid from the housing.

In an embodiment, the present invention broadly comprises a drain tool assembly for draining fluid contained in a housing that includes a plunger. The drain tool assembly including an adapter adapted to be coupled to the housing, an inner body disposed in and extending through the adapter and adapted to allow the fluid to flow from the housing through the drain tool assembly, and an outer body slidably coupled to the adapter and adapted to be disposed in a non-draining position, wherein the fluid in the housing does not flow through the drain tool assembly, and a draining position, wherein the inner and outer bodies are axially moved relative to the adapter and the fluid in the housing flows through the drain tool assembly.

In another embodiment, the present invention broadly comprises a drain tool assembly for draining oil contained in an oil filter canister housing that includes a spring-loaded plunger and a female threaded fitting. The drain tool assembly including an adapter adapted to threadably couple to the fitting and having an outside surface with a circumferential rim that includes a slot, an inner body disposed in and extending through the adapter and adapted to allow the oil to flow from the housing through the drain tool assembly, the inner body including a groove adapted to receive a snapring, and an outer body slidably coupled to the adapter and adapted to be disposed in a non-draining position, where the oil in the housing does not flow through the drain tool assembly, and a draining position, where the inner and outer bodies are axially moved relative to the adapter and the oil in the housing flows through the drain tool assembly. The outer body is coupled in an axial direction to the inner body via the snap-ring.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION OF THE EMBODIMENTS

Figure 1:
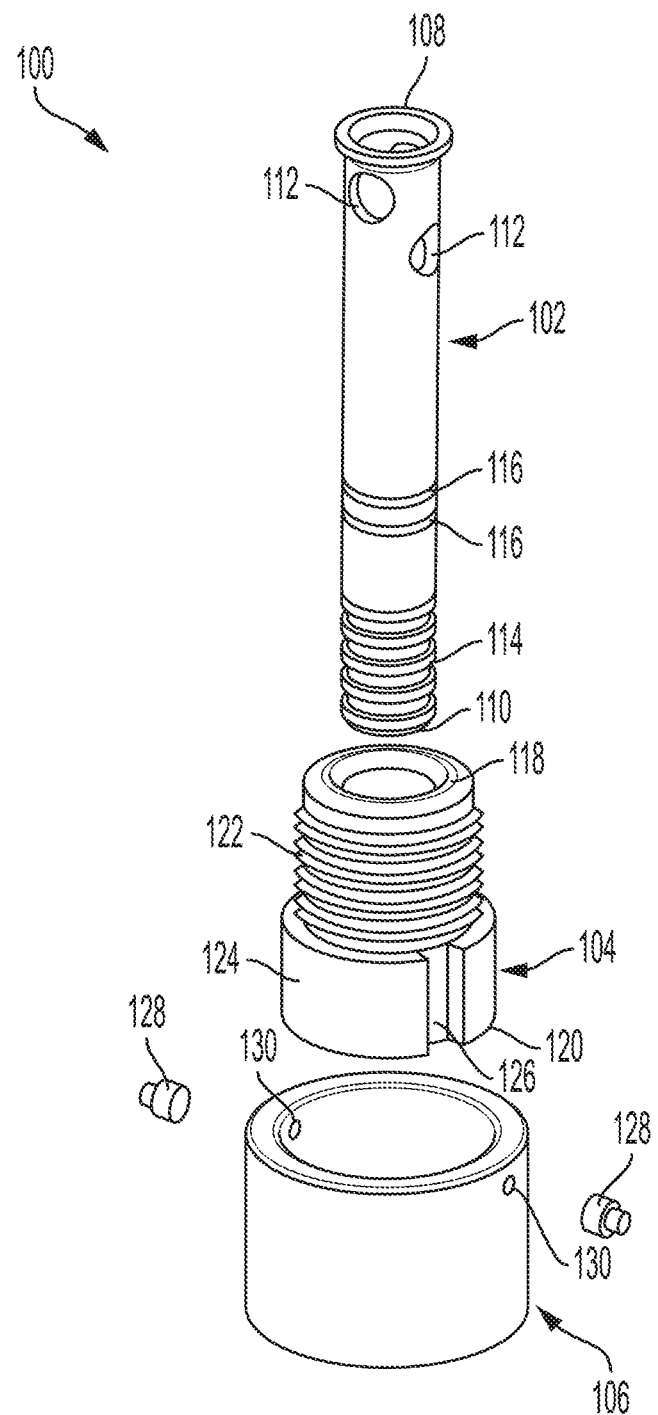
FIG. 1 is a perspective, exploded view of an embodiment of a drain tool of the present invention.
Figure 2:
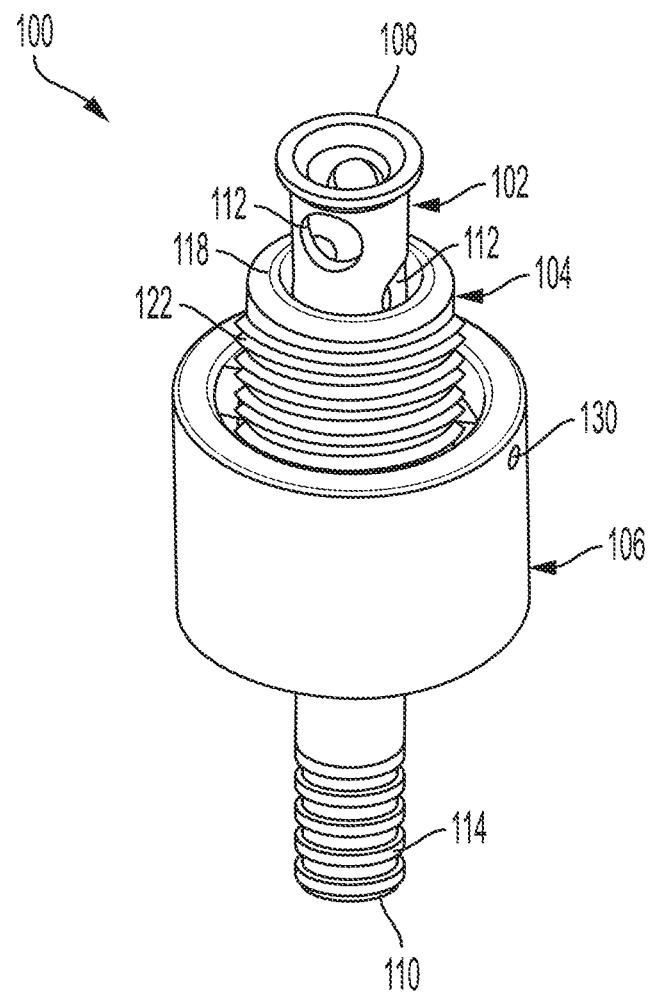
FIG. 2 is a perspective view of the drain tool of FIG. 1 in an assembled state.

While this invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated. As used herein, the term "present invention" is not intended to limit the scope of the claimed invention and is instead a term used to discuss exemplary embodiments of the invention for explanatory purposes only.

The present invention broadly comprises an oil canister drain tool assembly adapted to couple and create a seal with a housing (such as, for example, a housing of an oil filter canister) before selectively engaging a plunger of the housing to initiate draining of a fluid that is contained in the housing (such as, for example, oil). Such an assembly can be beneficial for, as an example, preventing fluid from inadvertently spilling or otherwise being released from the housing. In an embodiment, the drain tool assembly avoids fluid spillage of prior art devices that typically engage a plunger before creating a seal, by coupling a body with the housing and then engaging the plunger by locking a sleeve into an actuated position.

Referring to FIGS. 1 through 4, an embodiment of a drain tool assembly 100 of the present invention is shown. The drain tool assembly 100 may be coupled to a housing 200 (such as a housing of a typical oil filter canister) and a hose (not shown). As illustrated, the drain tool assembly 100 includes an inner body 102, an adapter 104, and an outer body 106.

The inner body 102 may be elongated, having any desired length, and may be of hollow construction. The inner body 102 is adapted to allow fluid, such as oil, to flow from the housing 200 containing the fluid through the drain tool assembly 100 to the hose. Although illustrated as having a circular cross-section, the inner body 102 can have other cross-sections, such as rectangular, square, elliptical, etc. The inner body 102 can have a smaller cross-sectional size than the adapter 104, which can be smaller than the cross-sectional size of the outer body 106. Accordingly, the inner body 102 can fit inside and couple to the adapter, as discussed below.

The inner body 102 is a hollow body having a first end 108 and a second end 110. The first end 108 and the second end 110 are in fluid communication with each other. The first end 108 is adapted to be coupled to the housing 200 via the adapter 104 without causing fluid to drain from the housing 200, thereby avoiding fluid spillage of prior art devices. Any number of apertures 112 may be disposed in the inner body 102 proximal to the first end 108 to assist in draining the fluid that is contained in the housing 200, such as, for example, oil. In an embodiment, any number of tapered grooves or barbs 114 may be disposed on the exterior surface of inner body 102 proximal to the second end 110 to couple the inner body 102 to a flexible or elastomeric hose in a well-known manner (for example, the grooves or barbs 114 may be a threaded connection, a friction fit type of connection, barbed connection, etc.). In an embodiment, the inner body 102 can have any number of snap ring grooves 116 for coupling the inner body 102 to the outer body 106 via snap rings in an axial direction, thereby allowing the inner body 102 to move with the outer body 106 when the outer body 106 is moved in the axial direction, as described below. However, other known methods of axially coupling the inner body 102 to the outer body 106 may be used.

For example, the inner body 102 may be disposed in and extend through the adapter 104 with the first end 108 and the snap-ring grooves 116 disposed on opposing ends of the adapter 104. The first end 108 may also include an outwardly extending flange that prevents the inner body 102 from being removed from the adapter 104. The outer body 106 is disposed on the inner body with the second end 110 extending out of the outer body 106, and the snap-ring grooves 116 with snap-rings (or other coupling mechanisms) are disposed on opposing sides of a flange of the outer body, for example a flange proximal to an end of the outer body 106. This couples the inner body 102 to the outer body 106, and allows the inner body 102 to move axially with axial movement of the outer body 106.

The adapter 104 can have a first end 118 and a second end 120. The adapter 104 is adapted to couple with the exterior surface of housing 200. As illustrated, the adapter can have a threaded portion 122 to threadably couple to a fitting 202, such as a female threaded fitting, of the housing 200. Different sized adapters 104 may be used such that the drain tool assembly 100 may be used with different sized fittings 202. The first end 118 can include a tapered seat or sealing seat that creates a substantially liquid-tight seal with a cooperative seat (not shown) in the housing 200 when the adapter 104 is coupled to the same.

The adapter 104 can include a circumferential rim 124 formed or machined onto the outer surface of the adapter. The circumferential rim 124 can include any number of slots 126 to slidably couple with the outer body 106, as discussed below. The adapter 104 can include any number of sealing grooves (not shown) disposed on an inside surface and coupled with, for example, an o-ring or other suitable seal, to form a seal with the inner body 102 when the inner body 102 is inserted into and coupled with the adapter 104.

Figure 3:
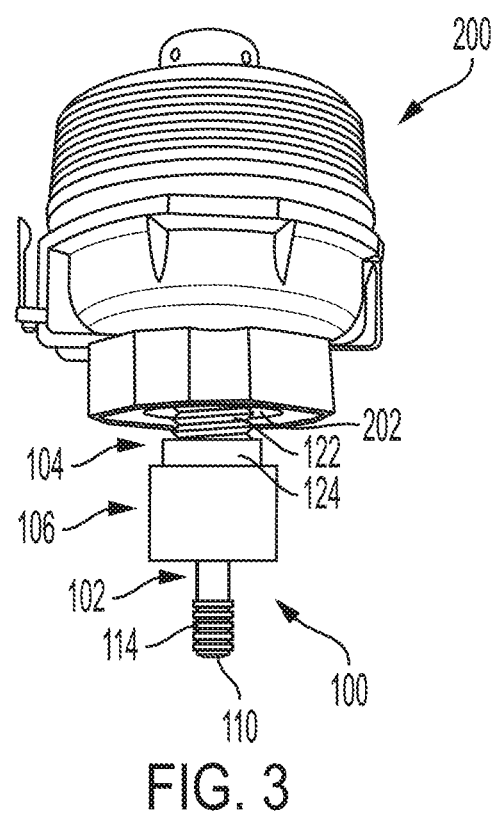
FIG. 3 is a side perspective view of the drain tool of FIG. 1 coupled to a typical oil filter canister housing and in a non-draining position.
Figure 4:
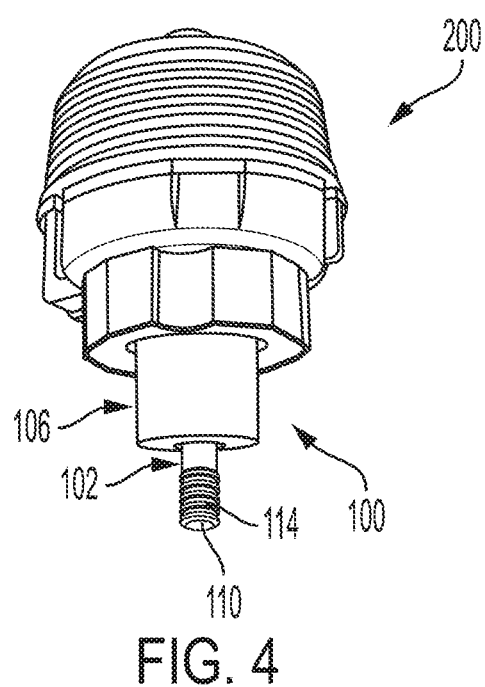
FIG. 4 is a side perspective view of the drain tool of FIG. 1 coupled to a typical oil filter canister housing and in a draining position.

The outer body 106 (also referred to as a sleeve) can include any number of protrusions 128 that correspond to the number of slots 126 in the adapter 104. The protrusions 128 can slidably couple with the slots 126, thereby allowing the outer body 106 to move in an axial direction (thereby also moving the inner body 102 in the axial direction) relative to the adapter 104 from a first position (also referred to as a non-draining position, as illustrated in FIG. 3) to a second position (also referred to as a draining position, as illustrated in FIG. 4). As discussed below, the outer body 106 causes the inner body 102 to depress the plunger of the housing 200, which causes fluid to flow out of the housing 200 when in the draining position. As illustrated, the protrusions 128 can be fasteners, such as screws or bolts, coupled to the outer body 106 via apertures 130. The apertures 130 can be threaded. In an embodiment, the protrusions 128 can be machined or formed on an inside surface of the outer body 106.

The slots 126 of the adapter 104 can include stops (not shown) proximate to the second end 120 of the adapter 104 to prevent the outer body 106 from sliding out of the slots 126 in an axial direction when the outer body 106 is moved from the actuated position to the unactuated position. In an embodiment, a snap ring (not shown) can be coupled to one of the snap ring grooves 116 of the inner body 102 to prevent the outer body 106 from sliding out of the slots 126 in an axial direction when the outer body 106 moved between the draining and non-draining positions.

When the outer body 106 is disposed in the draining position, the protrusions 128 are no longer slidably coupled to the slots 126. Accordingly, the outer body 106 can rotate relative to the adapter 104. When the outer body 106 is rotated, the protrusions 128 can abut the circumferential rim 124, thereby retaining or locking the outer body 106 in the draining position.

The housing 200 can be a conventional cartridge style oil filter that contains oil. However, the housing 200 can be any type of suitable container that holds fluid, such as liquid or gas. As described above, the housing 200 includes a fitting 202, such as a female threaded fitting. The fitting 202 can be constructed of brass or from other suitable materials. The housing 200 can include a plunger (not shown) that when actuated, causes fluid, such as oil, to flow out of the housing 200 via the threaded portion 202. The plunger can be actuated by the inner body 102 when the outer body 106 is positioned in the actuated position (as illustrated in FIG. 4). Conventional housings 200 also typically include a biasing mechanism (not shown), e.g., a compression spring, that biases the plunger to the non-draining position, thereby biasing the stopping the flow of fluid.

During a fluid draining sequence, the threaded portion 122 of the adapter 104 is threadingly coupled to the fitting 202 of the housing. The drain tool assembly 100 may then be moved from the non-draining position to a draining position to allow fluid to drain from a housing 200. When the drain tool assembly 100 is moved from the non-draining position to the draining position, the protrusions 128 of the outer body 106 slide along the slots 126 of the adapter 104, thereby allowing the outer body 106 and the inner body 102 to move in an axial direction relative to the adapter 104. When in the actuated position, the protrusions 128 of the outer body 106 are no longer coupled to the slots 126 of the adapter 104, thereby allowing the outer body 106 to rotate relative to the adapter 104. After the outer body 106 is rotated, the circumferential rim 124 of the adapter 106 retains the outer body 106 in the actuated position. Moving the outer body 106 to the draining position causes the inner body 102 to actuate (e.g., depress) the plunger of the housing 200, thereby allowing fluid to flow out of the housing 200 and through the drain tool assembly 100 to a hose coupled to the inner body 102 to transport the drained fluid to a storage receptacle.

After the desired amount of fluid is drained from the housing 200, the order of the fluid draining sequence described above is reversed to stop fluid from flowing. For example, the outer body 106 can be rotated relative to the adapter 104 until the protrusions 128 are aligned with the slots 126. The outer body 106 can be moved in an axial direction back to the non-draining position, thereby causing the inner body 102 to no longer actuate the plunger of the housing 200. The biasing member of the housing 200 can assist in returning the outer body 106 to the non-draining position. When the outer body 106 is in the non-draining position, the inner body 102 no longer actuates (e.g., depresses) the plunger. Accordingly, fluid flow is stopped.

As used herein, the term "coupled" and its functional equivalents are not intended to necessarily be limited to direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. A drain tool assembly for draining fluid contained in a housing that includes a plunger, the drain tool assembly comprising:
   an adapter including first and second adapter ends, a threaded portion disposed proximate the first adapter end and adapted to be threadably coupled to the housing, and a circumferential rim disposed between the threaded portion and the second adapter end, wherein the circumferential rim has a substantially circular cross-section and includes a slot extending from the second adapter end to the threaded portion;
   an inner body disposed in and extending through the adapter and adapted to allow the fluid to flow from the housing through the drain tool assembly, the inner body including first and second inner body ends, wherein the first inner body end forms an outwardly extending flange, and wherein the inner body includes a groove adapted to receive a coupling mechanism; and
   an outer body coupled in an axial direction to the inner body via the coupling mechanism and adapted to slidably engage with the slot to be selectively disposed in one of either a non-draining position, wherein the fluid in the housing does not flow through the drain tool assembly, and a draining position, wherein the inner and outer bodies are axially moved relative to the adapter and the fluid in the housing flows through the drain tool assembly,
   wherein when the inner and outer bodies are disposed in the draining position, the outer body is not slidably engaged with the slot to allow the outer body to rotate relative to the adapter, and the circumferential rim is adapted to retain the outer body in the draining position when the outer body is not engaged with the slot and is rotated relative to the adapter.

2. The drain tool assembly of claim 1, wherein the outer body includes a protrusion adapted to slidably engage with the slot, and wherein the outer body is adapted to axially move by the protrusion sliding relative to the slot to move the outer body between the non-draining and draining positions.

3. The drain tool assembly of claim 2, wherein when the outer body is disposed in the draining position, the protrusion is not slidably engaged with the slot to allow the outer body to rotate relative to the adapter, and the circumferential rim is adapted to retain the outer body in the draining position by engaging the protrusion when the protrusion is not engaged with the slot and the outer body is rotated relative to the adapter.

4. The drain tool assembly of claim 1, wherein the inner body is adapted to engage the plunger of the housing when the outer body is disposed in the draining position.

5. The drain tool assembly of claim 1, wherein the first inner body end is adapted to engage the plunger of the housing and the second inner body end is adapted to be coupled to a hose.

6. The drain tool assembly of claim 5, wherein the first and second inner body ends are in fluid communication with each other.

7. A drain tool assembly for draining oil contained in an oil filter canister housing that includes a spring-loaded plunger and a female threaded fitting, the drain tool assembly comprising:
   an adapter including first and second adapter ends, a threaded portion disposed proximate the first adapter end and adapted to threadably couple to the fitting, and a circumferential rim disposed between the threaded portion and the second adapter end, wherein the circumferential rim has a substantially circular cross-section and includes a slot extending from the second adapter end to the threaded portion;
   an inner body disposed in and extending through the adapter and adapted to allow the oil to flow from the housing through the drain tool assembly, the inner body including a groove adapted to receive a snap-ring; and
   an outer body coupled in an axial direction to the inner body via the snap-ring and adapted to slidably engage with the slot to be selectively disposed in one of either a non-draining position, wherein the oil in the housing does not flow through the drain tool assembly, and a draining position, wherein the inner and outer bodies are axially moved relative to the adapter and the oil in the housing flows through the drain tool assembly, wherein when the inner and outer bodies are disposed in the draining position, the outer body is not slidably engaged with the slot to allow the outer body to rotate relative to the adapter, and the circumferential rim is adapted to retain the outer body in the draining position when the outer body is not engaged with the slot.

8. The drain tool assembly of claim 7, wherein the groove includes first and second grooves adapted to respectively receive first and second snap-rings to couple the outer body to the inner body.

9. The drain tool assembly of claim 7, wherein the inner body includes first and second ends, and the first end includes an outwardly extending flange.

10. The drain tool assembly of claim 1, wherein the coupling mechanism is a snap-ring.

11. A drain tool assembly for draining fluid contained in a housing that includes a plunger, the drain tool assembly comprising:

an adapter including first and second ends, a threaded portion disposed proximate the first end and adapted to be threadably coupled to the housing, and a circumferential rim disposed between the threaded portion and the second end, wherein the circumferential rim has a substantially circular cross-section and includes a slot extending from the second end to the threaded portion;

an inner body disposed in and extending through the adapter and adapted to allow the fluid to flow from the housing through the drain tool assembly; and an outer body coupled in an axial direction to the inner body and including a protrusion adapted to slidably engage with the slot, wherein the protrusion is adapted to slide relative to the slot to move the outer and inner bodies between non-draining and draining positions, wherein the fluid in the housing does not flow through the drain tool assembly when the inner and outer bodies are disposed in the non-draining position, and the fluid in the housing flows through the drain tool assembly when the inner and outer bodies are disposed in the draining position, and wherein when the inner and outer bodies are disposed in the draining position, the protrusion is not slidably engaged with the slot to allow the outer body to rotate relative to the adapter, and the circumferential rim is adapted to retain the outer body in the draining position when the protrusion is not engaged with the slot.

12. The drain tool assembly of claim 11, wherein the inner body includes barbs adapted to retain a hose to the inner body.

13. The drain tool assembly of claim 11, wherein the protrusion is a fastener.

* * * * *